United States Patent Office

3,733,401
Patented May 15, 1973

3,733,401
HIGHLY ATTENUATED NEWCASTLE DISEASE VIRUS VACCINE AND PRODUCTION THEREOF
Homu Ito, Suita, Japan, assignor to Takeda Chemical Industries, Ltd., Osaka, Japan
No Drawing. Filed Nov. 30, 1970, Ser. No. 93,875
Int. Cl. C12k 7/00
U.S. Cl. 424—89                                 5 Claims

ABSTRACT OF THE DISCLOSURE

Highly attenuated Newcastle disease virus vaccine is provided, as well as method for production thereof by (1) either subjecting Newcastle disease virus (NDV) to at least 20 serial passages of cultivation in a porcine tissue culture, or cultivating the virus in porcine stable cell lines for at least 2 months, (2) inoculating the resultant porcine cells containing attenuated NDV onto a chorioallantoic membrane of a chick embryo and cultivating the inoculated chick embryo, and (3) subjecting the NDV recovered from the resultant complex of the chorioallantoic membrane and porcine cells to at least 2 serial passages of cultivation in the allantoic cavity of a chick embryo.

---

This invention relates to a novel and effective live Newcastle disease virus vaccine which also is highly attenuated, i.e. causes far less side-effects than those which have been on trial, and to a method for producing the same.

Newcastle disease, an acute febrile infectious disease of fowls, has been one of the serious causes of economic loss to the poultry industry. Though the viral nature of this infectious disease has been established and many strains of Newcastle disease virus have been isolated ("Southwestern Veterinarian," vol. 5 (1951), pp. 19–21 and "American Journal of Veterinary Research," vol. 16 (1955), pp. 450–457), neither an effective chemotherapeutic agent nor an effective chemoprophylactic agent against this disease has been found. Therefore, the only prophylactic means against this disease is immunization of fowls with an inactivated or a live vaccine of Newcastle disease virus (hereinafter sometimes referred to as "NDV"). In recent years, the employment of live NDV vaccines has been exalted to such an extent that it has been demonstrated that such live vaccines can be conveniently administered to fowls by spraying, or as an admixture with drinking water, and that they are antigenically more efficient.

However, the use of live NDV vaccines is best with hazards. That is, unless a live vaccine has been sufficiently attenuated, it tends to cause mixed infections with NDV and *Mycoplasma gallisepaticus* (PPLO), thus inducing serious respiratory illnesses, while an over-attenuated vaccine will not provide a sufficient antibody production to prevent NDV infections and the onset of the disease. Thus, the essential requirement of a practically employable live NDV vaccine is that it should have been attenuated to such an extent that its administration will not cause fowls to manifest the characteristic signs of Newcastle disease, and its antibody production is enough to effectively counter the challenge of a large amount of a wild NDV.

Though some methods for attenuation of NDV have been proposed for the production of live NDV vaccines, none has succeeded in producing a live NDV vaccine which can satisfy both the abovementioned essential requirements.

The principal object of the present invention is to provide a highly attenuated live NDV vaccine capable of satisfying the two essential requirements, i.e. one which provides a sufficient antibody production to prevent both NDV infections and the onset of the disease, but does not produce the Newcastle disease symptoms after vaccination.

Another object of the present invention is to provide a method for the production of the effective and highly attenuated live NDV vaccine with ease and at an economically feasible cost.

A further object of the present invention is to provide an effective and safe immunological measure for protecting fowls from contracting NDV infection without untoward side-reactions.

These objects are realized by subjecting NDV to a particular sequence of steps. These steps consist of cultivating NDV, either by serial passages in a porcine tissue culture for at least 20 times, or in porcine stable cell lines for at least about 2 months (Step 1), inoculating the resulting porcine cells containing attenuated NDV on a chorioallantoic membrane of a chick embryo and cultivating the chick embryo (Step 2), and subjecting the NDV recovered from the resultant complex of the chorioallantoic membrane and the porcine cells to serial passages of cultivation in the allantoic cavity of a chick embryo for at least 2 times (Step 3).

According to the method of this invention, any strain of Newcastle disease virus may be employed as the starting NDV.

The cultivation of Step 1 may be carried out by subjecting the starting NDV to serial passages of cultivation in porcine tissue culture or, alternatively, subjecting procine stable cell lines to persistent infection with the NDV.

The porcine tissue culture to be employed for the serial passages of the starting NDV may contain either porcine primary cells such as porcine primary kidney cells, porcine primary testicle cells or primary cells of pig embryo, or porcine stable cell lines derived from, in a per se known manner, the above-mentioned porcine primary cells. The starting NDV is inoculated in the tissue culture which contains these cells together with a suitable tissue culture medium, and is cultivated stationarily or rotationally at a temperature between about 30° C. and about 38° C. (usually about 32° C. to about 36° C.) for about 2 to about 10 days, and the proliferated virus is then inoculated into a fresh tissue culture containing porcine cells for the subsequent passage of cultivation. As each passage is repeated successively, the attenuation proceeds smoothly. The serial passages of cultivation are continued for at least 20 times, advantageously from about 50 to about 100 times, whereby the NDV has been sufficiently and adequately attenuated. For the new passages of cultivation with porcine tissue culture, it is preferable, up to and including the 20th serial passage, that the culture fluid of the preceding passage is diluted about $10^2$ to about $10^4$ times by volume and that the diluted fluid is employed as the seed virus to be inoculated for the subsequent passage of cultivation. In cases of serial passages of cultivation beyond 20 times, it is advantageous to repeat (practically three times) freezing of the culture broth obtained by the preceding passage and to employ as the seed virus the supernatant liquid of the thawed broth either as it is or after diluting about 10 to about 100 times by volume.

Alternatively, porcine stable cell lines are subjected to persistent infection with the starting NDV. As the porcine stable cell lines, there may be preferably employed, for example, porcine stable kidney cell lines, porcine stable testicle cell lines, and the like. The porcine stable cell lines cultivated in a suitable tissue culture medium are subjected to infection with the NDV.

Practically, it is advantageous to allow the porcine stable cell lines to be infected with the NDV at about 1:0.0001 to 1:10 M.O.I. (Multiplicity of Infection), most advantageously at about 1:1 M.O.I. Thus infected porcine stable cell lines are then cultivated stationarily or rotationally at a temperature between about 30° C. and about 38° C. (usually about 32° C. to about 36° C.), whereby the NDV proliferates while the porcine stable cell lines themselves also propagate. During this persistent infection, it is practical to renew or replenish the cultivation medium at intervals of about 2 to about 7 days, preferably about 3 days. Furthermore, as a practical measure for shortening the total period of persistent infection, it is possible to inoculate the fluid obtained during persistent infection into fresh porcine stable cell lines or primary cells of chick embryo, then to select small plaques) less than about 1 millimeter in diameter) of NDV from the resulting culture by a per se known plaque forming test employing porcine stable cell lines or primary cells of chick embryo (vol. 3, Method in Virology, Academic Press, New York, 1967, p. 289) and to subject fresh porcine stable cell lines to further persistent infection with the small plaques of NDV thus isolated.

The persistent infection is continued for at least 2 months, advantageously from about 15 to about 50 months, whereby the NDV has been sufficiently attenuated.

As the tissue culture media employed in Step 1 of the present invention, there may be mentioned, for example, Hanks' solution, Earle's solution, Gey's solution and the like. These media may be supplemented, as occasion demands, with suitable ingredients, e.g. lactalbumin hydrolyzate, inactivated calf serum and so on. Furthermore, there may be added to the medium an antibiotic or antibiotics such as penicillines, streptomycin, dihydrostreptomycin, neomycin or kanamycin so that the culture may be protected against propagation of adventitious microorganisms by accidental contamination.

Practically, NDV is cultivated in the allantoic cavity of a chick embryo for the production of a live NDV vaccine. However, the attenuated NDV of the present invention lacks the ability to proliferate in the allantoic cavity of a chick embryo and, therefore, the direct inoculation of the attenuated NDV into the allantoic cavity of a chick embryo results in substantially no proliferation of the virus.

According to the method of the present invention, the sufficiently attenuated NDV prepared in Step 1 can be imparted with the ability to proliferate in the allantoic cavity of a chick embryo by inoculating the porcine cells containing the attenuated NDV obtained in Step 1 onto a chorioallantoic membrane of a chick embryo and by subsequently cultivating the chick embryo (Step 2). As the chick embryo, there may be advantageously employed about 10 to 11-day-old chick embryos. Preferably, about $10^5$ to $10^7$ cells containing the attenuated NDV per egg are inoculated onto the chorioallantoic membrane of the chick embryo. The cultivation of the chick embryo thus inoculated with the attenuated NDV on its chorioallantoic membrane is preferably carried out stationarily at a temperature between about 35° C. and about 40° C., more preferably from about 36° C. to about 38° C. Generally, the cultivation of the attenuated NDV on the chorioallantoic membrane is continued for about 5 to 10 days, whereby the virus attains the ability of proliferating in the allantoic cavity of the chick embryo.

The NDV is recovered from the complex of the chorioallantoic membrane and the porcine cells formed in the chick embryo and then subjected to serial passages of cultivation in the allantoic cavity of chick embryos (Step 3). The recovery of the NDV from the complex and the inoculation of the virus into the allantoic cavity of chick embryos may be practically carried out by extracting, i.e. removing, the chorioallantoic membrane, on and in which the porcine cells have proliferated, from the chick embryos after the cultivation in Step 2, homogenizing the complex of the chorioallantoic membrane and the porcine cells in a suitable medium such as Hanks' solution, and inoculating the supernatant fluid or the filtrate (containing the NDV) separated from the resulting mixture into the allantoic cavity of chick embryos at about 1 to 1000 $EID_{50}$ (50% egg infective dose) per egg. As the chick embryo utilized in this step, there may be advantageously employed about 10 to 11-day-old chick embryos. The cultivation of the NDV in the allantoic cavity of the chick embryos is generally conducted stationarily for about 2 to 5 days at a temperature between about 35° C. and about 40° C., preferably from about 36° C. to about 38° C. The proliferated virus is then inoculated into the allantoic cavity of fresh chick embryos for the subsequent passages of cultivation. By repeating the cultivation at least once, preferably to a total of 3 to 10 serial passages of cultivation in this manner, the NDV proliferates in the allantoic cavity of the chick embryo at a sufficient multiplicity to yield an NDV vaccine.

The allantoic fluid recovered from the chick embryos after the last passage of cultivation can be used, as the NDV vaccine of the present invention, per se or diluted with a suitable diluent such as physiological saline or sterile distilled water in an amount of about 2 to about 1 million times, depending on its virus titer.

While the highly attenuated NDV vaccine thus produced is ready for use, it can be preserved in a frozen state with or without addition of one or more stabilizing agents such as sucrose, lactose, glutamates, phosphates and the like. Alternatively, it may be lyophilized with or without addition of one or more of such stabilizing agents as mentioned above. The lyophilized product becomes dissolved upon its use with a suitable diluent such as physiological saline or sterile distilled water.

As occasion demands, the NDV recovered from the allantoic fluid after the last passage of cultivation in Step 3 may be further cultivated in a suitable tissue culture system, e.g. one containing primary cells of a chick embryo, for the production of NDV vaccine. In this case, after cultivation solid matters such as cells, cell fragments or the like are removed, for example, by means of filtration or centrifugation, and the filtrate or the supernatant fluid can be used as the NDV vaccine of the present invention, per se or diluted with a suitable diluent such as mentioned above, depending on its virus titer.

The live NDV vaccine thus produced is characterized by its substantial absence of virulence as well as its high antibody production ability. That is to say, its inoculation at about $10^7$ $EID_{50}$ per chick to 10 day old chicks does not manifest any Newcastle disease symptoms and its inoculation at about $10^3$ $EID_{50}$ per chick to 10 day old chicks prevents them from any manifestation of the Newcastle disease symptoms even against the challenge of NDV at about $10^4$ $LD_{50}$ (50% Lethal Dose) at 14 days after the inoculation of the vaccine. Furthermore, the vaccination with the live NDV vaccine of the present invention provides remarkably prolonged immunizing effects as compared with the previously known vaccines.

The live NDV vaccine of the present invention may be administered to any kind of bird which is attacked by or otherwise susceptible to Newcastle disease, e.g., chicks, turkeys, pigeons, guinea fowls and the like, for prophylaxis of the disease. For a satisfactory vaccination, it is advantageous to inoculate at about $10^2$ to $10^5$ $EID_{50}$ per fowl. A dose higher than this does not give any danger of undesirable side-effects because of the high safety factor of the vaccine, but it would be meaningless to use a higher dosage since there is no particular increase in the desired effect of the vaccination.

The live NDV vaccine of the present invention may be inoculated to fowls, for example, orally, intranasally, as an eye-lotion, by spraying, or by subcutaneous or intramusuclar injection.

The safety and effectiveness of the highly attenuated NDV vaccine of the present invention will be further explained by way of tests hereinafter described.

The following examples are merely intended to illustrate presently preferred embodiments of this invention and are not intended as restricting the scope thereof.

References 1 and 2 illustrate the respective typical preparations of porcine primary kidney cells and porcine stable cell lines.

Throughout the present specification as well as in the following references, examples and tests, the "mcg.," "g.," "mm.," "ml." and "° C." respectively refer to microgram(s), gram(s), millimeter(s), milliliter(s) and degrees centigrade, and percentages are weight/volume unless otherwise specified.

REFERENCE 1

The kidney is extracted aseptically from a healthy young pig and decapsulated to remove the renal pelvis. The resulting renal cortex is aseptically sliced into fragments 3 to 5 mm. in size. The fragments of tissue are washed three times, each time with about 10 times their volume of the $Ca^{++}$- and $Mg^{++}$- free phosphate basic solution of Dulbecco [1] (pH 7.2) and suspended in about 10 times by volume of the said solution supplemented with 0.25% of trypsin (Difco 1:250). The suspension is agitated for 1 hour and subjected to centrifugation at 1,000 r.p.m. for 5 minutes. The resulting cells are suspended in such an amount of Lactalbumin Hanks' solution,[2] to which 5% of inactivated calf serum, 200 units/ml. of penicillin and 200 mcg./ml. of streptomycin were previously added that the resultant cell suspension contains about $2\times10^5$ cells/ml. The cell suspension is incubated stationarily in Roux bottles at about 37° C. for 96 hours to yield monolayer cells of porcine kidney.

REFERENCE 2

Monolayer cells of porcine kidney obtained in Reference 1 are subjected in the per se known manner to 50 times of serial passages of cultivation in the Lactalbumin Hanks' solution of the same composition as that employed in Reference 1 to give porcine stable cell lines.

Roux bottles containing porcine stable cell lines are tipped to remove the culture fluids, leaving the porcine stable cell lines on the inside wall of the bottles. The porcine stable cell lines are washed twice, each time with about 100 times by volume of the $Ca^{++}$- and $Mg^{++}$-free phosphate basic solution of Dulbecco (Reference 1) and kept overlaid with about 100 times by volume of the said solution containing 0.005% of trypsin (Difco 1:250) and 0.02% of ethylenediaminetetraacetic acid at about 37° C. for 20 minutes to give exfoliation of the porcine stable cell lines.

The porcine stable cell lines are suspended in such an amount of the Lactalbumin Hanks' solution of the same composition as employed in Reference 1, that the resultant cell suspension contains about $2\times10^5$ cells/ml.

The cell suspension is incubated stationarily in Roux bottles at 37° C. for 72 hours to yield the porcine stable cell lines which can be employed for proliferation of NDV.

---

[1] The $Ca^{++}$- and $Mg^{++}$-free phosphate basic solution of Dulbecco consists of:

| | | |
|---|---|---|
| NaCl | g | 8.0 |
| KCl | g | 0.2 |
| $Na_2HPO_4$ | g | 1.15 |
| $KH_2PO_4$ | g | 0.2 |
| Water | ml | 800 |

[2] Lactalbumin Hanks' solution is prepared by dissolving 5 g. of lactalbumin hydrolyzate in Hanks' solution as described below to make the total 1,000 ml.

Hanks' solution consists of:

| | G. |
|---|---|
| NaCl | 8.0 |
| KCl | 0.4 |
| $CaCl_2$ | 0.2 |
| $MgSO_4\cdot7H_2O$ | 0.2 |
| $Na_2HPO_4\cdot2H_2O$ | 0.06 |
| $KH_2PO_4$ | 0.06 |
| $NaHCO_3$ | 0.25 |
| d-Glucose | 1.0 |
| Phenol red | 0.02 |
| Distilled water (triple-distilled) in an amount to make the total 1 liter. | |

EXAMPLE 1

A seed virus of NDV, Tokyo Strain (vol. 7, Virus, The Society of Japanese Virologists, pp. 109–110, 1957; also deposited at American Type Culture Collection under the designation VR 623) is inoculated at about 1:1 M.O.I. into the monolayer cells of porcine kidney in the Lactalbumin Hanks' solution prepared in Reference 1 and cultivated stationarily at about 35° C. for 7 days. The culture fluid is centrifuged at 3,000 r.p.m. for 10 minutes to separate the supernatant liquid which is to be used as the seed virus in the next serial passage after dilution with 100 times by volume of Hanks' solution. From the 21st passage of cultivation, the culture broth obtained in the preceding passage is three times subjected to alternating freezing treatment and thawing treatment and the supernatant liquid recovered from the third thawed broth is employed as the seed virus in the next passage after dilution with 10 times by volume of Hanks' solution.

In this manner, the passage with porcine kidney cells is repeated to give a total of 50 serial passages.

About $10^6$ cells per egg of the primary kidney cells obtained in the 50th passage of cultivation are inoculated onto a chorioallantoic membrane of about 11-day-old chick embryos before the anticipated hatching date and the chick embryos are cultivated stationarily at about 37° C. for 8 days.

The complex of the chorioallantoic membrane and the porcine cells is recovered from the eggs, admixed with Hanks' solution in 2 ml. per egg, then homogenized. The homogenized mixture is centrifuged at 3,000 r.p.m. for 5 minutes. The resulting supernatant liquid shows about 100 $EID_{50}$ (50% egg infective dose)[3] per 0.2 ml.

The supernatant liquid is inoculated into the allantoic cavity of about 11-day-old chick embryos before the anticipated hatching date at 0.2 ml. per egg and cultivated stationarily at about 36° C. for 5 days. The allantoic fluid harvested from the eggs is, after being diuted with 10 times by volume of Hanks' solution, inoculated into the allantoic cavity of fresh chick embryos and cultivated similarly as above. In this manner, the passage of the NDV in the allantoic cavity of chick embryos is repeated a total of two times. The supernatant liquid of the allantoic fluid obtained in the 3rd passage shows about $10^8$ $EID_{50}$ per 0.2 ml.

The supernatant liquid, after dilution by $10^5$ times by volume of Hank's solution, is inoculated aseptically into the allantoic cavity of about 10-day-old chick embryos before the anticipated hatching date and cultivated stationarily at 36° C. for 2 days. After the eggs are kept standing at about 4° C. for 12 hours, the allantoic fluid is recovered from the eggs. The allantoic fluid is centrifuged at 3,000 r.p.m. for 5 minutes to separate the supernatant liquid which is a highly attenuated live NDV vaccine. The supernatant liquid shows about $10^8$ $EID_{50}$ per ml.

The product is frozen for storage at −70° C. After a year storage, it is thawed and diluted $10^5$ times by volume with physiological saline. The diluted vaccine is inoculated by spraying on chicks to exhibit the desired effect of immunization in the chicks.

EXAMPLE 2

Porcine stable cell lines in the Lactalbumin Hanks' solution prepared in Reference 2 are infected with a seed virus of NDV, Tokyo Strain (same as utilized in Example 1) at about 1:1 M.O.I. and cultivated stationarily at about 36° C. for 15 months, during which period the culture medium is renewed at intervals of about 5 days.

About $10^6$ cells per egg of the porcine stable cell lines thus persistently infected with the NDV are inoculated onto the chorioallantoic membrane of about 10-day-old

---

[3] $EID_{50}$ is determined employing a tenfold dilution system according to the per se known method described in Vol. 2, Virology, 1956, pp. 57–68.

chick embryos before the anticipated hatching date, and the chick embryos are cultivated stationarily at about 37° C. for 7 days.

The complex of the chorioallantoic membrane and the porcine cells is harvested from the eggs, admixed with Hanks' solution in an amount of 2 ml. per egg, then homogenized. The homogenized mixture is centrifuged at 3,000 r.p.m. for 5 minutes.

The supernatant liquid is inoculated into the allantoic cavity of about 11-day-old chick embryos before the anticipated hatching date at 0.2 ml. per egg and cultivated stationarily at 36° C. for 5 days. The allantoic fluid recovered from the egg is, after being diluted with 10 times by volume of Hanks' solution, inoculated into the allantoic cavity of fresh chick embryos and cultivated similarly as above. In this manner, the initial passage of the NDV in the allantoic cavity of the chick embryos is repeated only once. The supernatant liquid of the allantoic fluid obtained in the 2nd passage shows about $10^7$ $EID_{50}$ per 0.2 ml.

The supernatant liquid, after dilution with $10^4$ times by volume of Hanks' solution, is inoculated aseptically into the allantoic cavity of about 10-day-old chick embryos before the anticipated hatching date, and cultivated stationarily at 36° C. for 2 days. After the eggs are kept standing at about 4° C. for 12 hours, the allantoic fluid is recovered from eggs and centrifuged at 3,000 r.p.m. for 5 minutes to separate a supernatant liquid which is a highly attenuated live NDV vaccine. The supernatant liquid shows about $10^8$ $EID_{50}$ per ml.

Test 1

One ml. of the live NDV vaccine showing $10^8$ $EID_{50}$ per ml. prepared in Example 1 was inoculated intravenously to each of five chicks 10 days after hatching and the clinical condition of each bird was observed. No symptoms of Newcastle disease were exhibited. In addition, assay of the blood stream of the chicks for the NDV at the end of the second day after the inoculation gave consistently negative results.

As for five chicks which were similarly inoculated with the parent strain of NDV used in Example 1, i.e. the non-attenuated virus, the blood samples taken at the end of 2 days and 4 days after the inoculation and diluted to 10 times their original volumes were assayed to contain $10^2$ $EID_{50}$ of the virus per 0.2 ml.

Test 2

One ml. of the diluted NDV vaccine showing $10^3$ $EID_{50}$ per ml. prepared in Example 1 was inoculated intravenously to each of three chicks 10 days after hatching. Fourteen days after the vaccination, the parent strain of NDV was inoculated intravenously to the chicks at about $10^4$ $LD_{50}$ (50% lethal dose)[4] per bird.

[4] $LD_{50}$ is determined according to the per se known method described in Vol. 27, American Journal of Hygiene, 1938, pp. 493-497.

The chicks vaccinated with the live vaccine showed no signs of Newcastle disease over a period of one month after the challenge whereas control chicks which were not vaccinated suffered from onsets of typical Newcastle disease as early as the 2nd day after the challenge of the parent strain of NDV, showing serious symptoms such as diarrhea, dyspnea, inability to rise and the like, and ultrimately died within 5 to 7 days.

The results are summarized in Table 1 below.

TABLE 1

| Group of chicks | Chick number | Viremia (NDV in 0.2 ml. of blood stream at 2 days after the challenge) | Newcastle disease symptoms of chicks after the challenge | | | | | | | |
|---|---|---|---|---|---|---|---|---|---|---|
| | | | 1st day | 2d day | 3d day | 4th day | 5th day | 6th day | 7th day | 30th day |
| Vaccinated group | 1 | | | | | | | | | |
| | 2 | | | | | | | | | |
| | 3 | | | | | | | | | |
| Unvaccinated group | 4 | $10^2$ $EID_{50}$ | + | ++ | +++ | Dead | | | | |
| | 5 | $10^2$ $EID_{50}$ | + | ++ | ++++ | ++++ | +++++ | Dead | | |
| | 6 | $10^2$ $EID_{50}$ | + | ++ | ++++ | ++++ | +++++ | Dead | | |

Note: +=Anorexia; ++=Diarrhea; +++=Sprawled out, with dyspnea; ++++=Eyes closed, head tucked under wing +++++=Sprawled out.

I claim:
1. A method for producing an attenuated Newcastle disease virus vaccine with lessened tendency to cause infections with *Mycoplasma gallisepticus* [PPLO] as a side effect inducing serious respiratory illness arising from mixed infections of *Mycoplasma gallisepticus* [PPLO] with Newcastle disease virus which comprises
   (1) subjecting any live unattenuated parent strain of Newcastle disease virus capable of causing typical symptoms of the disease to at least 20 and advantageously from about 50 to about 100 serial passages of cultivation at a temperature of about 30° C. to about 38° C. in a mixture of porcine tissue primary kidney cells and suitable culture medium therefor, or subjecting porcine stable kidney cell lines, in a suitable culture medium therefor, to persistent infection with Newcastle disease virus whereby the Newcastle disease virus proliferates while the procine cells themselves also propagate for at least about two months, to obtain a mixture of procine cells and attenuated Newcastle disease virus, said attenuated Newcastle disease virus being unable to proliferate substantially upon direct inoculation of the allantoic cavity of a chick embryo,
   (2) inoculating the procine cells containing the attenuated Newcastle disease virus into or onto a chorioallantoic membrane of a chick embryo and cultivating the inoculated chick embryo at a temperature of about 35–40° C. for about 5–10 days,
   (3) recovering a complex of the chorioallantoic membrane and porcine cells from the product of step 2,
   (4) homogenizing the complex of step 3 in a suitable medium and recovering a liquid containing attenuated Newcastle disease virus from the medium,
   (5) subjecting the attenuated Newcastle disease virus in the liquid recovered in step 4 to at least 2 and preferably to a total of 3 to 10 serial passages of cultivation in the allantoic cavity of a chick embryo, each passage being conducted at a temperature of about 35–40° C. for about 2–5 days, and
   (6) recovering the allantoic fluid from the chick embryo after the last passage of cultivation in step 5.

2. A highly attenuated Newcastle disease virus vaccine prepared in accordance with the method of claim 1 which when inoculated at about $10^7$ $EID_{50}$ per chick to 10 day old chicks does not manifest any Newcastle disease symptom and when inoculated at about $10^3$ $EID_{50}$ per chick to 10 day old chicks is effective in preventing the chick from exhibiting any Newcastle disease symptom against the challenge of Newcastle disease virus at about $10^4$ $LD_{50}$ at about 14 days after the inoculation of the vaccine.

3. The vaccine of claim 2 in admixture with a pharmaceutically acceptable stabilizing agent selected from the group consisting of sucrose, lactose, glutamates and phosphates.

4. The lyophilized product of the vaccine of claim 3.

5. The product of claim 4 in admixture with a pharmaceutically acceptable diluent.

References Cited

Vet. Bull. 33 #1570 (1963).
Vet. Bull. 34 #1784, #3730, #4535 (1964).
Vet. Bull. 36 #1005 (1966).
Vet. Bull 39 #2935 (1969).

SHEP K. ROSE, Primary Examiner

U.S. Cl. X.R.

195—1.1, 1.3, 1.5

UNITED STATES PATENT OFFICE
CERTIFICATE OF CORRECTION

Patent No. 3,733,401   Dated May 15, 1973

Inventor(s) HOMU ITO

It is certified that error appears in the above-identified patent and that said Letters Patent are hereby corrected as shown below:

Page 1, column 1, line 8, in the heading insert

--Claims priority, application Japan, November 29, 1969, 95,819/1969--

Signed and sealed this 27th day of November 1973.

(SEAL)
Attest:

EDWARD M. FLETCHER, JR.
Attesting Officer

RENE D. TEGTMEYER
Acting Commissioner of Patents